United States Patent [19]
Divine

[11] 3,756,003
[45] Sept. 4, 1973

[54] APPARATUS FOR LOADING PARTICULATE MATERIALS SUCH AS FESCUE SEED FROM A FIELD INTO HAULING CARRIERS

[75] Inventor: William T. Divine, Archie, Mo.

[73] Assignee: Frank Orville Buerge, Archie, Mo.; a part interest

[22] Filed: Dec. 8, 1971

[21] Appl. No.: 205,915

[52] U.S. Cl. .............................................. 56/344
[51] Int. Cl. ........................................... A01d 65/04
[58] Field of Search ..................... 56/344, 345, 350, 56/351, 354, 355, 358, 126

[56] References Cited
UNITED STATES PATENTS
2,615,295  10/1952  Sishc .............................. 56/344 UX
2,654,209  10/1953  Raney et al. ....................... 56/344 X FOREIGN PATENTS OR APPLICATIONS
997,730   7/1965  Great Britain ....................... 56/344
230,993   4/1959  Australia ............................ 56/350
1,472,159 1/1967  France .............................. 56/345

Primary Examiner—Robert Peshock
Assistant Examiner—J. N. Eskovitz
Attorney—William B. kircher

[57] ABSTRACT

An apparatus for loading particulate materials such as fescue seed has a scraper and a pan support structure which is interconnected with a three point hitch of a tractor. The scraper pan has a lifting auger located therein which is operable to convey the particulate material out of the pan and into an accompanying truck or wagon. A second auger is angularly located with respect to the input of the lifting auger within the confines of the scraper pan to move the particulate material within the scraper pan into the lifting auger input portion.

3 Claims, 5 Drawing Figures

PATENTED SEP 4 1973 3,756,003
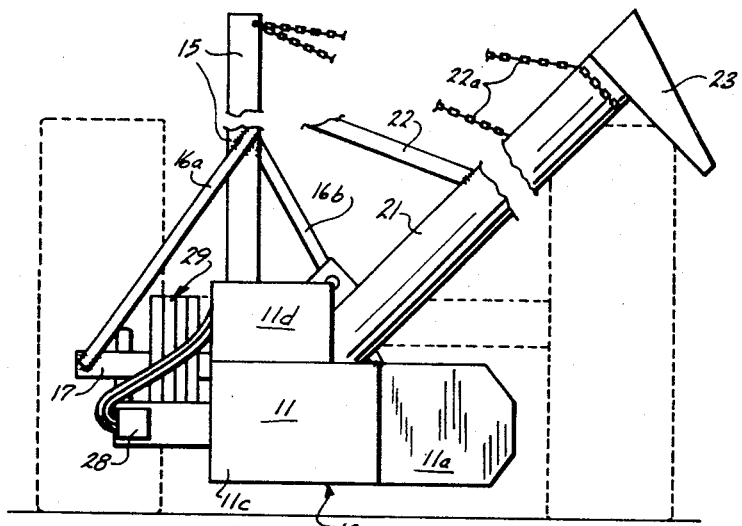
Fig. 1.
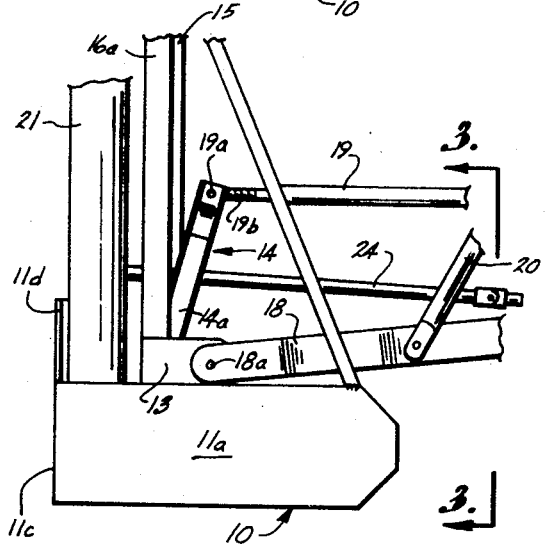
Fig. 2.
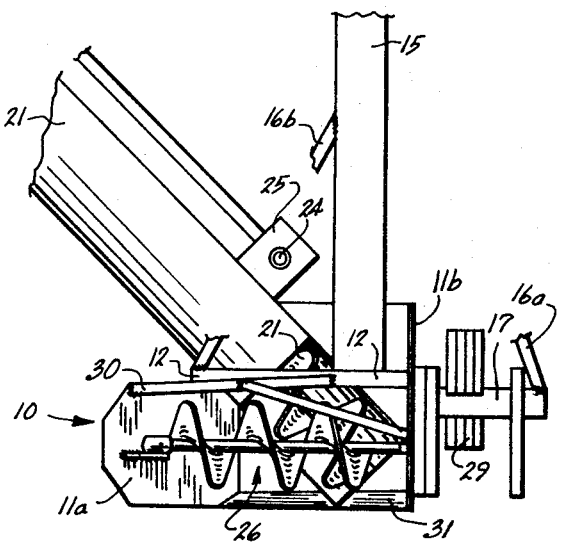
Fig. 3.
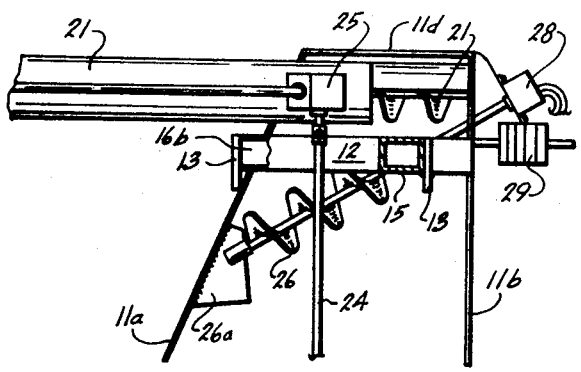
Fig. 4.
Fig. 5.
INVENTOR
William T. Divine
BY
ATTORNEYS

APPARATUS FOR LOADING PARTICULATE MATERIALS SUCH AS FESCUE SEED FROM A FIELD INTO HAULING CARRIERS

BACKGROUND AND BRIEF DESCRIPTION OF THE INVENTION

The harvesting of seed crops from grasses such as fescue and bluegrass has long presented a problem in the ability to properly dry or cure the seed and then load same into a hauling vehicle. Since the seeds of fescue and bluegrass plants are particulate and almost fluent in nature, very little, if any, conveying was accomplished by the utilization of an auger type conveyor.

Prior art loading techniques generally consisted of the particulate seed being mounded up into large piles and a front end loader being utilized to scoop the seed from the large piles and then dumping same within a truck or trailer. The inherent disadvantages of this particular loading method resulted from the increased labor cost in material handling since the seed had to be dried and then mounted into a large pile and from the fact that once mounded into a pile the moisture content of the seed was difficult to control. Stated another way, the seed when mounded in a pile, would dry only on the exterior surface of the mound thereby leaving the inner pile portion at a potentially excessive moisture content. Further, with front end loaders, it is virtually impossible to only skim off the dry portion of the pile since by its very nature the front end loader "digs in" or "scoops up" when loading its bucket.

My invention permits grass seeds such as bluegrass and fescue to be cured and dried in windrows of sufficient depth to permit easy drying by turning and moving, and at the same time, it allows the seed crop to be loaded into a hauling vehicle directly from the window either by progressively loading the entire windrow or by any selected elevational levels depending upon the moisture of the seed at the various depths within the windrow.

The invention includes a scraper pan which is attached to a three point tractor hitch of the type which may be hydraulically raised and lowered. The scraper pan may be of any convenient shape but is shown in the accompanying drawings as being substantially U-shaped and located at the rear end of the tractor so that the closed part of the U may be elevated to contact the entire windrow of seeds or any elevational portion thereof. The scraper pan houses the input end of a lift conveyor and has same located at what may be thought of as the output end of an angularly oriented cross conveyor which moves the seed within the scraper pan to the input of a lift conveyor. Sufficient structurals are utilized with respect to the scraper pan and the two conveyors to provide adequate support and stability for movement of the apparatus through normal terrain.

The cross conveyor is an auger type powered by an auxiliary hydraulic motor with the axis of same in a horizontal plane but angled at approximately a 45° angle with respect to the axis of the lift conveyor. The lift conveyor is also an auger type which is driven off of the tractor PTO and includes the usual lower boot structure, the auger cylindrical casing and a gravity discharge chute at the outer upper end thereof that is sufficiently elevated to permit a particulate fluid seed to be loaded into a truck or tractor with relatively high sides. It is entirely possible that the hauling portion disclosure and claims could be an attached "grain or seed tank" rather than an independent separate vehicle.

The method portion of my invention includes the following steps locating said particulate material into windrows, moving a scraper pan through said windrows in a preselected substantially horizontal plane, conveying the particulate material within said pan to a preselected portion of said pan, conveying said particulate material from said preselected pan portion out of said pan, and discharging said conveyed out particulate material into a material hauling vehicle.

An object of the invention is to provide a unique method and apparatus for loading particulate material such as fescue and bluegrass seed into a vehicle such as a high side truck or wagon bed and to accomplish said loading from a ground level.

Another object of my invention is to provide a uniquely constructed apparatus for loading grass seed by means of auger type conveyors. It is a feature of my invention that grass crops, having very small seeds such as bluegrass and fescue, have heretofore been very difficult if not impossible to efficiently convey and lift by means of a screw type auger conveyor. My invention facilitates the utilization of the aforementioned equipment in a novel and unique fashion.

A still further object of my invention is to provide a unique method and apparatus for loading particulate material such as grass seeds, said method and apparatus accomplishing the loading task in a shorter period of time, with less labor, and in a more efficient manner than what was heretofore known.

A still further object of my invention is to provide a rugged, relatively inexpensive and easily attached seed loading apparatus. It is a feature of my invention that various types of tractors and/or prime movers may be used with my device, the only requirement being that a three point hitch be available for optimizing the operating plane of the loader apparatus.

Another object of my invention is to provide a unique method for loading grass seeds such as fescue and bluegrass. It is a feature of this method that the grass seed may be arranged in windrows prior to loading and that accurate moisture content checks may be made at particular levels within the windrow and only that portion of the windrow having the proper moisture content utilized for loading purposes.

A further object of my invention is to provide a uniquely constructed apparatus for loading grass seeds into a hauling vehicle, said apparatus having at least two augers so arranged that one auger delivers the seed into the input of the other auger thereby insuring that the last mentioned auger is capable of lifting the seed up and into the hauling vehicle.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals indicate like parts in the various views:

FIG. 1 is a rear elevational view of the seed loading apparatus with portions of the lift auger conveyor with the vertical support for same broken to illustrate variable lengths and with broken lines shown therein indicating the rear wheels on a prime mover such as a tractor;

FIG. 2 is a side elevational view of the seed loading apparatus shown in FIG. 1 with only the lower portions of the supporting framework, lift auger and a three point suspension system of the prime mover being shown;

FIG. 3 is a front elevational view taken generally along the line 3—3 of FIG. 2 in the direction of the arrows, however with portions of the three point suspension removed to better illustrate the relationship between the two augers;

FIG. 4 is a top elevational view of the seed loading apparatus with the supporting framework, three point suspension system connection removed to illustrate the two auger relationship; and FIG. 5 is a top elevational view of the triangular frame and three point suspension connection which is shown in side elevation of FIG. 2.

Turning now more particularly to the drawing, reference numeral 10 generally illustrates the seed loading apparatus. The scraper pan 11 is constructed of sheet metal and is angularly formed in a substantially U-shaped (when viewed from above as in FIG. 4) with the closed portion of the U being the aft portion of the scraper pan and with the open portion of the U being formed by spaced apart sides which are designed to collect and locate the windrowed grass seed therebetween. The opposed sides of the scraper pan are identified by the numerals 11a and 11b with the aft or closed U portion indicated at 11c. It should be pointed out that the exteme left rear (looking forwardly from the rear) section has an upper boot plate 11d extending above the upper edge of the scraper pan and acts as a conveyor boot or deflecting shield during the loading operation.

As best seen in FIGS. 2, 4 and 5, a supporting horizontal frame 12 is welded to the upper edge surfaces of the sides 11a and 11b of scraper pan 11 on the aft half portion thereof. The frame will include the forwardly extending ears 13 and a triangular mount 14 (having angled sides 14a and 14b) for the "third point" of the three point suspension. A vertical support 15 of rectangular tubular cross-section is located between one leg (14a) of triangular support 14 and the right (when viewed from above as in FIG. 5) three point suspension interconnecting ear 13. This vertical support may be of a variable height depending upon the weight and position of the lift auger which will be described later. Support structural 16a and 16d add additional support for the vertical member 15 with support 16a being weldedly attached at its lower end to a substantially flat horizontally oriented counterbalance weight support 17 while the angled brace 16b extends from the left hand end portion of supporting frame 12 to a welded interconnect with the vertical support 15. While the triangular frame structure 14 (formed by side elements 14a, 14b and frame 12) shown in FIG. 2 indicates that same is angled from the vertical, it should be understood that the frame sides of triangle frame 14a and 14b may be in a substantially vertically oriented plane and that the proper angulation is variable dependent upon the location of certain bracing structurals.

The three point suspension which is hydraulically movable as a part of the tractor prime mover is represented by the lower parallel arms 18 and the upper "third point" pivoting arm 19. It is contemplated that a conventional hydraulic cylinder 20 will be used to articulate the lift arms 18 about the usual interconnection to selectively raise and lower the attached structure. As shown in FIGS. 2 and 5, the lower arms 18 pin connect at 18a with the forward apertured end portion of ears 13. Further, arm 19 pin connects with the upper vertex portion of the triangular frame 14 at 19a. It should be noted that the "third point" arm (19) is adjustable in length and that the external threads 19b are provided for that particular purpose. In this manner, the appropriate reciprocal movement of the schematically indicated hydraulic cylinders cause the lower arms 18 to raise or lower, however the pin interconnects 18a at the lower arms and 19a at the third point arm (19) permits the seed loading device to be maintained in a level or operating position within the normal elevational range.

Turning now to the augers, a lift auger 21 of a conventional design is located near the aft end portion of scraper pan 11 and boot or shield 11d. This location is facilitated by the brace 22 which fixedly locates the angular relationship between the vertical support 15 and the housing of auger 21. Finally, chain supports 22a may be utilized for additional support of the end portion of the lift auger. Conventional brackets and/or weldments may be utilized to affix the lift auger input adjacent the rear left hand (when viewing same in a forward direction) inside area of the scraper pan 11. Gravity discharge chute 23 will be located at the output end of auger 21 to direct the seed into the associated conveying vehicle (either truck or wagon). The flighting of auger 21 will be powered by the tractor PTO 24 through an appropriate gear box 25.

A cross auger 26 will be mounted in a substantially horizontal plane and extends from a mounting shelf 26a on scraper pan side 11a through an appropriate opening in scraper pan side 11b to a motor mount 27 which angularly extends from the weight strip 17 to the aft end of pan 11. This motor mount (27) provides for the locating of a conventional hydraulic motor 28 thereon. In this position, the axis of the cross auger 26 is at an approximate 45° angle with respect to a vertical plane to the axis of lift auger 21. Accordingly, rotation in the proper direction will move or force the seed within the scraper pan into the input end of auger 21 for lifting purposes.

As suggested above, the weight strip 17 will accommodate counterbalancing weights 29 (the weights being slotted to slide fit on the strip 17) thereon so that the weight of the lift auger will not cause the apparatus to tip or become skewed with respect to its optimal operating position. The structurals generally indicated by the numeral 30 in the FIG. 3 are weldedly attached between the supporting frame 12 and the sides 11a and 11b of the pan 12 to form an integral unit. Also, the boot portion of auger 21 will have a lower incline surface 31 which extends forwardly from the rear portion 11c of pan 11 so that the seed deposited by auger 26 locates on the upper surface thereof for subsequent upward movement by auger 21.

In operation, the above-described apparatus has particular utility when a seed crop has been placed in windrows for drying and/or curing purposes. Accordingly, the seed need not be mounded into large piles for loading but may be loaded directly from the drying or curing windrow. Therefore, the common practice of having a curing or drying field with the harvested crops being delivered thereto and the windrows appropriately mounded further facilitates the utilization of the subject method and apparatus.

The loading of the windrow seed crop will commence with the attachment of the apparatus to a conventional tractor three point hitch which is hydraulically movable to the appropriate horizontal operating plane. If moisture tests within the windrow reveal that only the upper half of a windrow is suitable for loading, the three point hitch is elevated so that the lower edge of the scraper pan 11 will contact the requisite windrow half. Then, forward movement of the tractor (or other appropriate prime mover) along the length of the windrow causes the scraper pan 11 to "knock off" the dry portion of the windrow thereby filling same with seed in proximity of the cross conveyor 26 which is now being powered by hydraulic motor 28. The cross conveyor (auger 26) delivers and forces the seed crop within pan 11 into the intake end portion of the lift conveyor auger 21. With the particulate and generally fluent nature of grass seeds, the force feeding into the input end of the lift auger sufficiently loads same to facilitate the upward conveying of the seed to the discharge spout 23 which will be positioned over a following truck or tractor bed. Therefore, the loading action will continue for the entire length of the seed crop windrow and only the seed having the proper moisture content therein will be loaded. Once at the end of the windrow, the apparatus attached to the tractor is easily turned around so that an adjacent windrow may be loaded in the same manner. With this type of loading arrangement it is possible to load nearly an entire windrow leaving very little if any of the valuable seed crop on the ground and the proper moisture content is assured. Further, multiple handlings of the seed is eliminated since it is now possible to load same immediately from its normal drying position.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An apparatus for loading particulate material, said material being arranged in rows, said apparatus being attachable to and supported from a prime mover such as a tractor, said apparatus comprising means for attaching said apparatus to said prime mover, said prime mover being operable to move said apparatus into a contacting relationship with said material, a scraper pan, said scraper pan having an open front portion, side portions and a rear portion, said side portions being spaced apart, said side portions cooperating with said rear portion to define a confined area permitting said rows of particulate material to be directed therebetween as said apparatus is being moved by said prime mover, said attaching means including a means for adjusting the height of the scraper pan with respect to said wind rows thereby permitting a preselected portion of said wind rows to be contacted by said scraper pan as said apparatus is being moved by said prime mover, a first auger mounted on said scraper pan with the axis of said auger being angularly oriented with respect to the fore and aft center line of said scraper pan, said auger being operable to convey said material within said pan, a second conveying means having an inlet located adjacent the rear portion of said scraper pan, said second conveyer means operable to lift said particulate material which enters said inlet up and out of said scraper pan and to deposit same in a receptacle, said angular relationship of said auger with said center line being such that the output end of said auger is disposed adjacent the inlet of said conveying means and with the axis of said auger substantially extending diagonally across at least a portion of open front end portion of said scraper pan.

2. The combination as in claim 1 including said second conveyor means extending upwardly and out of said scraper pan over one of said side portions of said scraper pan, said inlet to said second conveyer means being located adjacent the other side portion of said scraper pan and in communicating relationship with the outlet end of said auger, said auger operating to force said particulate material within said scraper pan into the inlet of said second conveyer means as said apparatus is placed in a moving and contacting relationship with said material.

3. The combination as in claim 2 including a counter balancing weight attached to said scraper pan, said counter balancing weight operable to properly orient said scraper pan with respect to said rows of said particulate material by counterbalancing the weight of said second conveyer means, said counterbalance attached to the side of said scraper pan adjacent the inlet to said second conveyor means.

* * * * *